(12) United States Patent
Yoo et al.

(10) Patent No.: US 7,925,785 B2
(45) Date of Patent: Apr. 12, 2011

(54) ON-DEMAND CAPACITY MANAGEMENT

(75) Inventors: Won Suk Yoo, Redmond, WA (US); Anil K. Ruia, Issaquah, WA (US); Michael E. Brown, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 12/163,934

(22) Filed: Jun. 27, 2008

(65) Prior Publication Data

US 2009/0327459 A1 Dec. 31, 2009

(51) Int. Cl.
*G06F 15/173* (2006.01)
(52) U.S. Cl. ........ 709/241; 709/201; 709/217; 709/220; 709/223; 709/227; 709/252
(58) Field of Classification Search .................. 709/220, 709/226, 242, 201, 217, 227, 232, 238, 252, 709/223
See application file for complete search history.

(56) References Cited

U.S. PATENT DOCUMENTS

| | | | |
|---|---|---|---|
| 5,774,660 A | 6/1998 | Brendel et al. | |
| 5,951,694 A * | 9/1999 | Choquier et al. | 714/15 |
| 6,351,775 B1 | 2/2002 | Yu | |
| 6,597,956 B1 * | 7/2003 | Aziz et al. | 700/3 |
| 6,691,165 B1 | 2/2004 | Bruck et al. | |
| 6,816,905 B1 * | 11/2004 | Sheets et al. | 709/226 |
| 6,920,116 B1 * | 7/2005 | Hossain et al. | 370/329 |
| 6,970,944 B2 | 11/2005 | Johnson et al. | |
| 7,020,707 B2 * | 3/2006 | Sternagle | 709/230 |
| 7,028,312 B1 | 4/2006 | Merrick | |
| 7,080,143 B2 * | 7/2006 | Hunt et al. | 709/224 |
| 7,103,628 B2 * | 9/2006 | Neiman et al. | 709/201 |
| 7,124,188 B2 | 10/2006 | Mangipudi et al. | |
| 7,154,898 B1 | 12/2006 | Pecus et al. | |
| 7,194,522 B1 | 3/2007 | Swildens et al. | |
| 7,209,977 B2 | 4/2007 | Acharya et al. | |
| 7,243,121 B2 * | 7/2007 | Neiman et al. | 709/201 |
| 7,278,008 B1 * | 10/2007 | Case et al. | 711/209 |
| 7,305,429 B2 | 12/2007 | Borella | |
| 7,395,536 B2 * | 7/2008 | Verbeke et al. | 718/100 |
| 7,454,516 B1 | 11/2008 | Weinert | |
| 7,472,184 B2 * | 12/2008 | Creamer et al. | 709/224 |
| 7,490,220 B2 * | 2/2009 | Balasubramonian et al. | 712/32 |
| 7,516,221 B2 * | 4/2009 | Souder et al. | 709/226 |
| 7,533,141 B2 * | 5/2009 | Nadgir et al. | 709/200 |
| 7,543,020 B2 * | 6/2009 | Walker et al. | 709/203 |

(Continued)

OTHER PUBLICATIONS

Dynamic Load Balancing on Web-Server Systems http://nclab.kaist.ac.kr/lecture/te628_2001_Fall/seminar/papers/00769420.pdf (12 Pages) (Jun. 1999).

(Continued)

*Primary Examiner* — Michael Won
(74) *Attorney, Agent, or Firm* — Workman Nydegger (57) ABSTRACT

Dynamically upsizing and/or downsizing a network farm in response to network demand. An application message router routes messages to the network farm. When the network farm approaches or is anticipated to be approaching capacity, a group of one or more servers may be added to the network farm. When the added server(s) are capable of participating in the network farm, the application message router is triggered to route also to the added servers. When the network farm has excess capacity, a group of one or more servers may be dropped from the network farm. This may be accomplished by triggering the application message router to no longer route messages to the removed servers. The removed servers may be either immediately or gracefully removed from service.

13 Claims, 6 Drawing Sheets

U.S. PATENT DOCUMENTS

| | | | |
|---|---|---|---|
| 7,543,052 B1 * | 6/2009 | Cesa Klein | 709/224 |
| 7,650,637 B2 * | 1/2010 | Li et al. | 726/15 |
| 2002/0040400 A1 | 4/2002 | Masters | |
| 2002/0120727 A1 | 8/2002 | Curley | |
| 2003/0005090 A1 * | 1/2003 | Sullivan et al. | 709/220 |
| 2003/0079027 A1 | 4/2003 | Slocombe et al. | |
| 2004/0066782 A1 * | 4/2004 | Nassar | 370/389 |
| 2004/0083289 A1 * | 4/2004 | Karger et al. | 709/226 |
| 2004/0221038 A1 * | 11/2004 | Clarke et al. | 709/226 |
| 2004/0267897 A1 * | 12/2004 | Hill et al. | 709/217 |
| 2004/0267920 A1 | 12/2004 | Hydrie et al. | |
| 2005/0228856 A1 | 10/2005 | Swildens et al. | |
| 2006/0008273 A1 | 1/2006 | Xue et al. | |
| 2006/0031506 A1 | 2/2006 | Redgate | |
| 2006/0117093 A1 | 6/2006 | Aviani | |
| 2006/0129675 A1 | 6/2006 | Zimmer | |
| 2006/0179106 A1 * | 8/2006 | Turner et al. | 709/201 |
| 2007/0124477 A1 | 5/2007 | Martin | |
| 2007/0180453 A1 * | 8/2007 | Burr et al. | 718/105 |
| 2007/0214265 A1 | 9/2007 | Zampiello et al. | |
| 2007/0258465 A1 | 11/2007 | Ma | |
| 2009/0313345 A1 | 12/2009 | Dollar | |
| 2009/0327460 A1 * | 12/2009 | Yoo et al. | 709/221 |

OTHER PUBLICATIONS

Constraint-Based Routing in the Internet: Basic Principles and Recent Research http://www.cs.purdue.edu/homes/fahmy/papers/routing.pdf (15 Pages).

Design and Implementation of an MPLS Based Load Balancing Architecture for Web Switching http://elm.eeng.dcu.ie/~dragosr/publications/ITC-SS15-24-dragos.pdf (9 Pages).

Using Signatures to Improve URL Routing http://www.cse.usf.edu/~christen/ipccc02.pdf (8 Pages).

Opus: An Overlay Peer Utility Service http://nsl.epfl.ch/dkostic/publications/openarch02.pdf (12 Pages).

Content Delivery Network Services http://www.savvis.net/NR/rdonlyres/8FAEDD9B-3B9E-4FE5-9080-860D04DD0C65/5967/cdn_brochure1.pdf (8 Pages).

Server Load Balancing http://www.echomountain.com/ServerLoadBalancing.html (3 Pages).

ZXTM: Zeus Extensible Traffic Manager http://www.zeus.com/documents/en/ZX/ZXTM_Features.pdf (4 Pages).

Web Server Scalability http://download.microsoft.com/download/7/4/f/74fe970d-4a7d-4034-9f5d-02572567e7f7/20_CHAPTER_7_Web_Server_Scalability.doc (54 Pages).

U.S. Appl. No. 12/163,941, filed Sep. 14, 2010, Office Action.

* cited by examiner

ON-DEMAND CAPACITY MANAGEMENT

BACKGROUND

Network farms are a cluster of servers that collaborate to provide an integrated service. Often, web sites are implemented as a network farm. Network farms often have dynamically changing scalability needs based on the nature and demand for the service the network farm provides. For example, e-commerce sites may often experience seasonal demand during certain holiday seasons during which gift giving and exchange is traditional. On-line trading sites may experience more demand at certain times of the day perhaps just after the market opens, just before the market closes, just after lunch. Credit card sites may experience monthly peaks just before monthly payments are due. News information sites may experience dramatic demand peaks as news-worthy events unfold.

Typically, such network farms build out enough capacity to handle the spikes in demand. The downside of this approach is that when the demand goes down, more servers are idling or at least significantly below capacity. Accordingly, excess capacity is wasted. The Application Request Routing is providing a set of APIs that can be used to address this problem by providing real-time traffic load information and dynamically changing the traffic routing rules to add or remove server resources.

BRIEF SUMMARY OF THE INVENTION

Although not required, some embodiments described herein relate to methods for dynamically upsizing and/or downsizing a network farm in response to network demand. An application message router routes messages to the network farm. When the network farm approaches or is anticipated to be approaching capacity, a group of one or more servers may be added to the network farm. When the added server(s) are capable of participating in the network farm, the application message router is triggered to route also to the added servers.

When the network farm has excess capacity, a group of one or more servers may be dropped from the network farm. This may be accomplished by triggering the application message router to no longer route messages to the removed servers. In one embodiment, the removed servers may be immediately removed from service. Alternatively or in addition, the removed servers may be gracefully removed from service. For instance, if there are pre-existing stateful sessions being served by the removed servers, perhaps only those messages that related to those pre-existing sessions may be routed to the removed servers.

In one embodiment, the process of routing application messages using the application message router may be accomplished using an application program interface. Alternatively, this same application program interface may be used to provide a report regarding one or more performance parameters of the network farm, thereby allowing intelligent decision marking as to whether to add or remove server(s) from the network farm.

This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Embodiments described herein relate to a computer-assisted mechanism for dynamically upsizing and/or downsizing a network farm in response to network demand. An application message router routes messages to the network farm. When the network farm approaches or is anticipated to be approaching capacity, a group of one or more servers may be added to the network farm. When the added server(s) are capable of participating in the network farm, the application message router is triggered to route also to the added servers. When the network farm has excess capacity, a group of one or more servers may be dropped from the network farm. The rerouting operations may occur immediately thereby seamlessly permitting a transition from the prior network farm to the resized network farm. First, some introductory discussion regarding a computing system in which the principles described herein may be employed will be described with respect to FIG. 1. Then, the basic principles of the application request router and examples uses will be described with respect to FIGS. 2 through 8.

Figure 1:
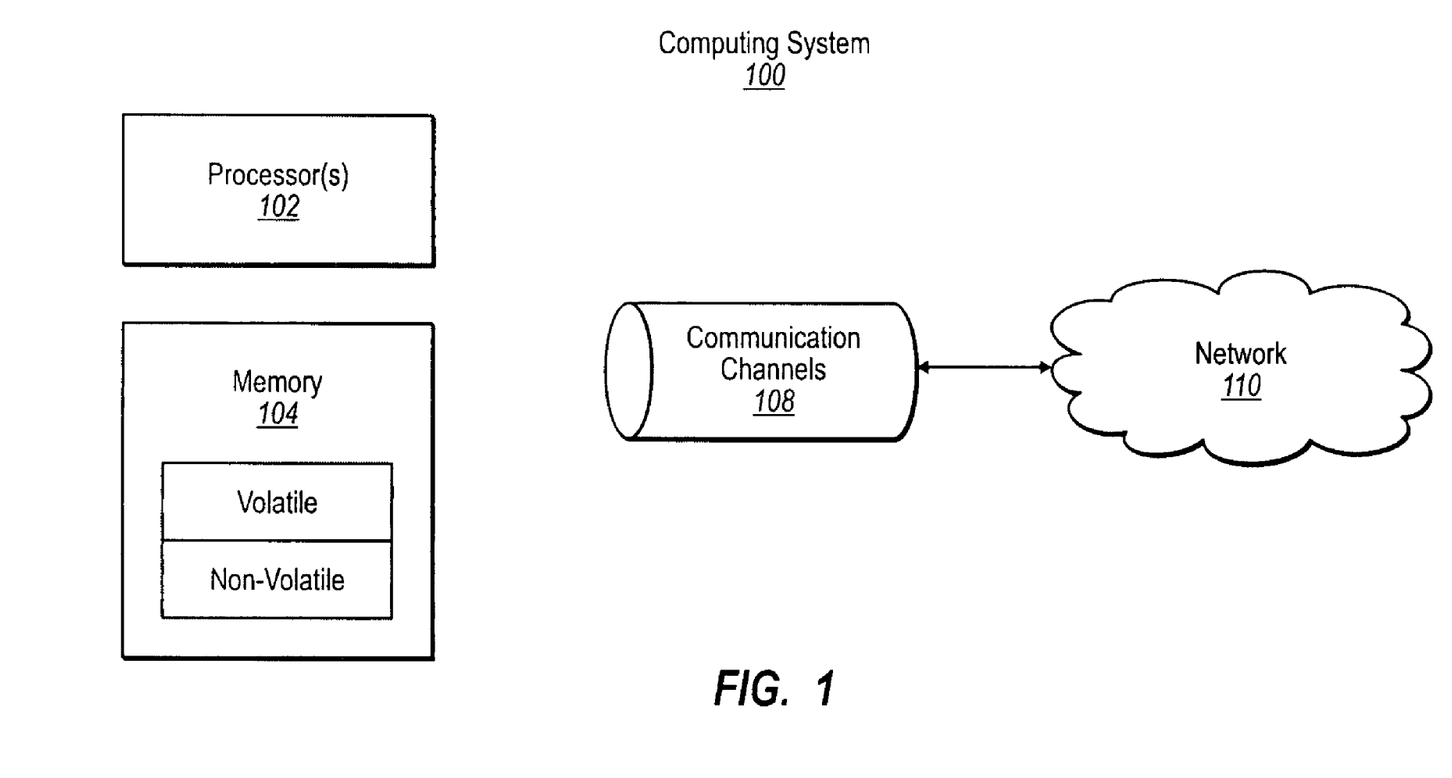
FIG. 1 illustrates a computing system in which embodiments described herein may operate.

FIG. 1 illustrates a computing system 100. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110 (such as perhaps the Internet). Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term "computer-readable media" as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
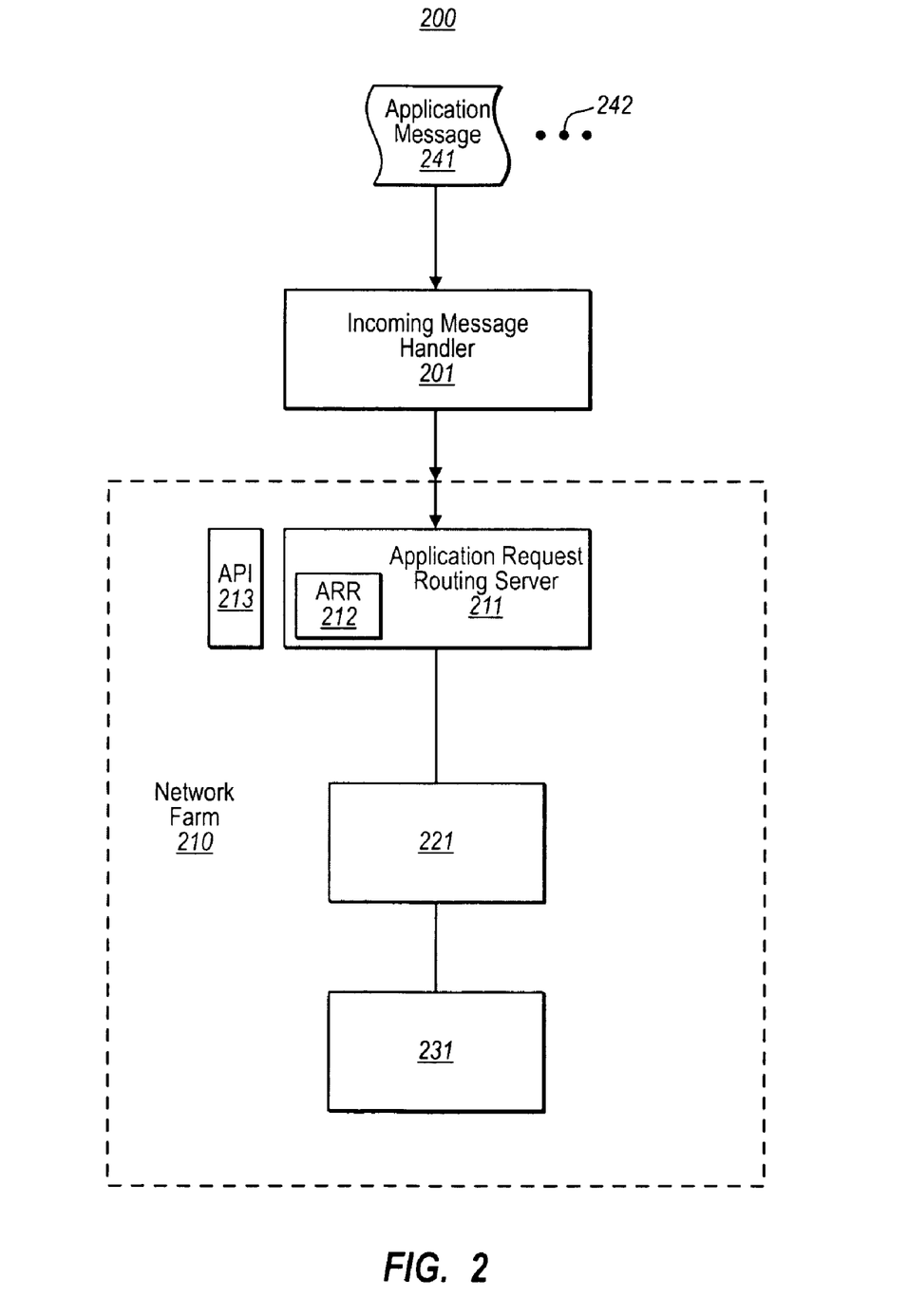
FIG. 2 illustrates a message processing environment that represents just one of many network farm environments in which the principles described herein may operate.

FIG. 2 illustrates a message processing environment 200 that represents just one of many environments in which the principles described herein may operate. The environment 200 includes an incoming message handler 201 that receives application messages 241 and 242. The application message is an application level message that may be sent and interpreted at the application level in the protocol stack. Only one application message 241 is illustrated. However, the horizontal ellipses 242 represents that the incoming message handler 201 may handle more application level messages. In fact, the incoming message handler 201 may handle an enormous number of application messages perhaps on a continuing basis. Herein, the terms "application message" and "application level message" may be used interchangeably. In some cases the application message will have been transmitted over a network, although that is not necessary. For instance, if the message processing environment 200 occurs in the computing system 100 of FIG. 1, the application messages may be received over the network 110.

The incoming message handler 201 may be any module or combination of modules that applies logic to determine the destination of the application message. One possible destination is the network farm 210, which is the only relevant destination for purposes of this description. Accordingly, the other possible destinations are not illustrated. In this case, the network farm 210 includes multiple physical servers that operate in a common sphere of trust and collaborate to offer an integrated service. The network farm 210 may perhaps be identified under a single identifier such as, for example, a web farm alias.

One of the possible advantages of this application request routing server 211 is that the network farm 210 may have any one of a practically enumerable variety of configurations. In addition, the network farm 210 may be seamlessly resized in response to network demand. The application messages may be appropriately routed in many configurations and in response to a resizing of the network farm. For purposes of illustration only, the network farm 210 is illustrated as initially being in a three-tier architecture, with the application request routing server 211 in tier one, with one server 221 tier two, and with one server 231 in tier three. As an example only, the server 221 might be, for example, a content server, and the server 231 might be, for example, a database server accessible to the content server.

The incoming message handler 201 and the application request routing module 212 may each be application level modules that may be located on the same physical machine, or on different physical machines. In one embodiment, they are part of an application level pipeline that multiple application level modules may register with. If the application level pipeline is on a single machine, the various application level modules of that pipeline would also be on the same single machine. Through the use of a pipeline, the application request routing module 212 may integrate seamlessly other application level functions such as, for example, caching. An example of such an extensible pipeline is provided by Internet Information Services (IIS) Server, which is a pipeline that is implemented on a single machine at least in its present version.

Examples of an incoming message handler may be, for example, a Uniform Resource Locator (URL) rewrite module, a mail server, or perhaps a SHAREPOINT® module. In the case of an IIS pipeline (at least in its current version), for example, the mail server might be a MICROSOFT® Web Access module. The IIS pipeline in its current version is also compatible with a SHAREPOINT® module. Having said that, in some embodiments, the incoming message handler 201 is optional as will be described further below.

Figure 3:
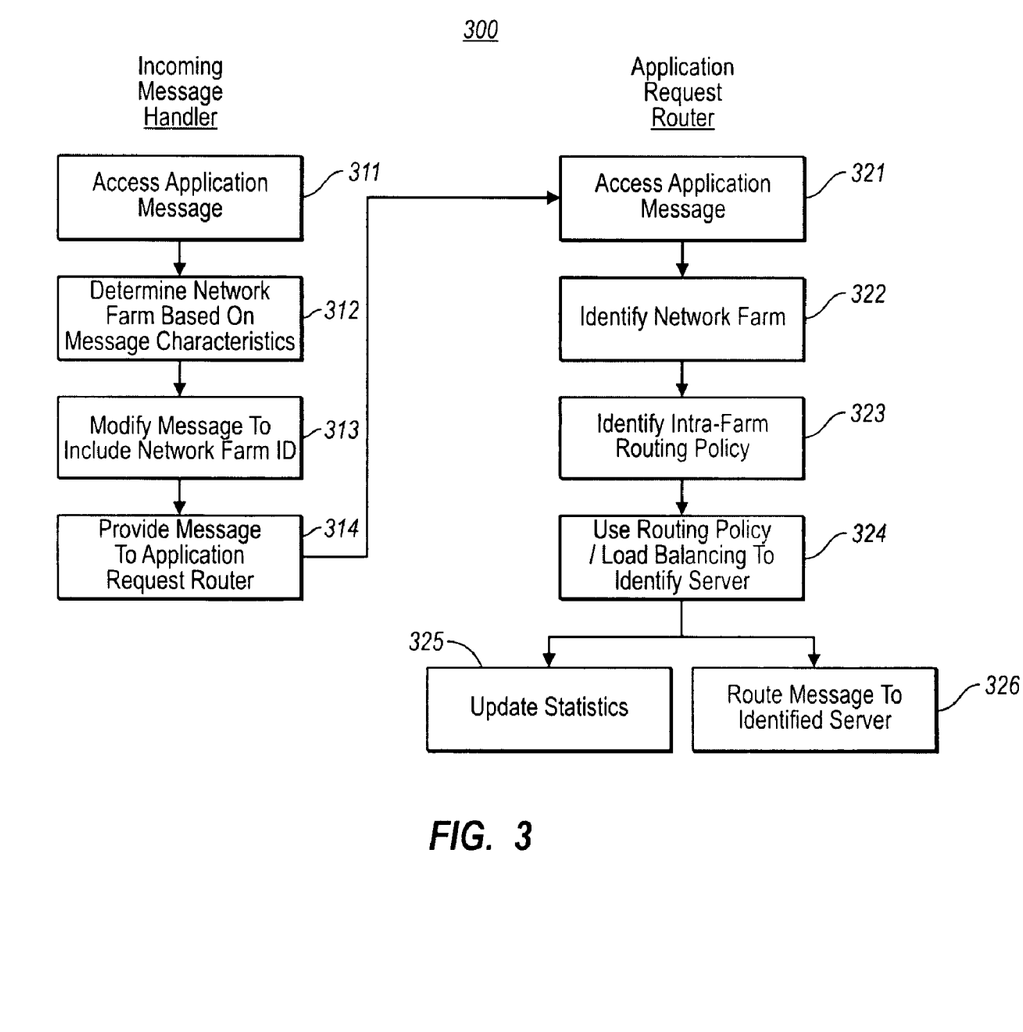
FIG. 3 illustrates a flowchart of a method for directing incoming application level network messages through a network farm.

FIG. 3 illustrates a flowchart of a method 300 for directing incoming application level network messages through a network farm. Some of the acts of the method 300 may be performed by the incoming message handler 201 as represented in the left column of FIG. 3 under the heading "Incoming Message Handler". Others of the acts of the method 300 may be performed by the application request routing module 211 as represented in the right column of FIG. 3 under the heading "Application Request Router".

The incoming message handler accesses a network message (act 311). For instance, in FIG. 2, the incoming message handler 201 accesses the application level message 241.

The incoming message handler may determine external routing policy associated with the application message sufficient to identify a network farm that the application message is to be routed to (act 312). That external routing policy may be configurable, and though the actual routing may depend on some characteristics in the application message itself, the routing is not at least initially specified in the application message. For instance, the incoming message handler 201 may identify that the application message 241 is to be routed to the network farm 210.

In addition, the incoming message handler 201 may also modify the application message to designate the network farm the application message is to be sent to (act 313). The application message is then provided to the application request routing module corresponding to that network farm (act 314). For instance, this may be done with the assistance of an application level pipeline such as, for example, IIS.

The application request routing module then accesses the application message (or at least a modified version of the application message) from the incoming message handler (act 321). For instance, in FIG. 2, the application message 221 may be received by the application request routing server 211 from the incoming message handler 201.

The application request routing module then identifies the network farm associated with the message (act 322). This might be done by, for example, inspecting the network farm identifier that was added by the incoming message handler. The application request router identifies the routing policy for the network farm (323). If the application request router serves but a single network farm, as might be the case if the application request router resides in the network farm, there might be only a single set of intra-farm routing policies that is used by the application request router. On the other hand, if there are multiple network farms served by the application request router, the application request router would access the intra-farm routing policy corresponding to the network farm.

The application request router may also determine one or more characteristics of the application message since the policy for determining which server in the network farm is to handle the application message (i.e., the intra-farm routing policy) might be dependent on certain characteristics of the application message. The precise characteristic types needed will depend on the specific intra-farm routing policy. One type of routing policy might depend on the file type of the target file that is the object of the application message. Another type of routing policy might depend on the anticipated processing time associated with processing the message, and so forth.

The application request routing module may optionally statistically track the characteristics of incoming messages. Accordingly, when a message having particular characteristics is received, the routing module may update that statistical information (act 325). This statistical information may assist a network administrator of the network farm 210 in determining not only whether one or more servers of the network farm are reaching capacity, but also what types of application messages are causing the greatest contribution.

For instance, suppose video file requests are saturating network bandwidth or are saturating processing capabilities of various servers. The administrator may view the statistical information to determine that this is the case. Accordingly, instead of scaling horizontally, the administrator may decide that one of the servers needs to be reconfigured to only handle requests for video files. That server may thus become specialized, thereby reducing the variety of application messages that the remaining servers have to deal with. This specialization can allow for more efficient use of processing and bandwidth as compared to the alternative of horizontal scaling.

However, the configurable intra-farm routing policy was obtained, that policy may then be used to identify which of the servers in the network farm will handle the request (act 324). That intra-farm routing policy may also depend on the current state of the network farm. The application request router 212 may then forward the application message to the identified server (act 326). For instance, the application request router 212 may then forward the application message 241 to either the server 221 or the other server 222 in accordance with the intra-farm routing policy corresponding to the network farm 210. If there are multiple possibilities for which server the request may be routed to, the incoming message handler 201 may also perform load balancing. For instance, the routing policy may also incorporate load balancing by routing to the lesser-utilized servers. Other farm state that might be relevant for the intra-farm routing policy might include which servers are operating properly and which are not.

The application message is then dispatched accordingly to the routing policy (act 326).

Up until now, the network farm 210 has been discussed as have a fixed number of servers. However, the application message routing module 212 provides a set of Application Program Interfaces 213 that allow a user or other computing entity to monitor network farm activity and/or reconfigure the routing policy of the application message routing module 212.

Figure 4:
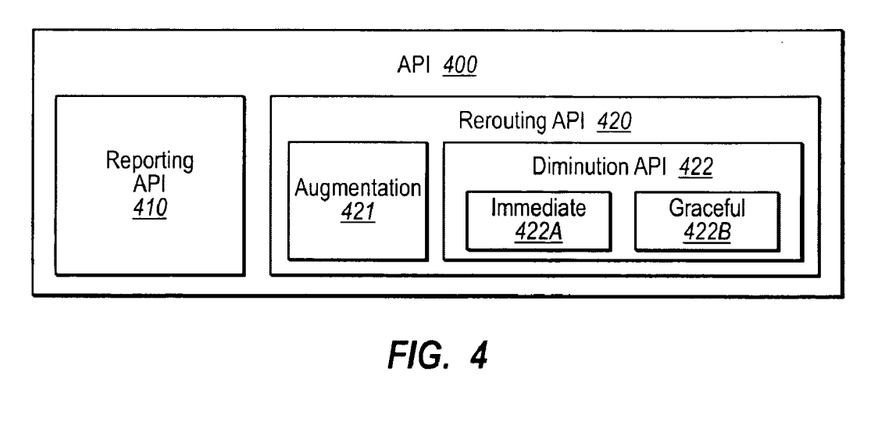
FIG. 4 abstractly illustrates an example of an application program interface that may be used to report performance status and augment or diminish a network farm.

FIG. 4 abstractly illustrates an example of the application program interface 213 of FIG. 2 in the form of application program interface 400. The application program interface 400 includes a reporting application program interface 410 and a rerouting application program interface 420. In FIG. 4, there are various application program interfaces illustrated schematically. Such application program interfaces may be different in the method of the function call. Alternatively, one or more or all of the application program interfaces may be represented by the same method, but may differ according to one or more input parameters. The various application program interfaces may be provided by different programs or by the same program, and may be part of the same application that provides the application message routing module 212 of FIG. 2.

The reporting interface 410 reports regarding one or more performance parameters of the network farm 210. For instance, the reports might be regarding the response time reported by each server in the network farm. An increase in this number might be an indicator that the network farm should be augmented by one or more servers. Other performance parameters might include, but are not limited to, the number of available connection sockets, average processor utilization, average bandwidth utilization, average size of the message queue backlog, and whatever other performance parameter might be of interest. Thus, the reporting interface 410 allows a user or other computing entity (such as a component, module, or application) to determine or estimate when a network farm is reaching capacity thereby warranting augmentation of the network farm by one or more additional servers, or to determine or estimate when a network farm has sufficient excess capacity to warrant removal of one or more of the servers from the network farm. Other examples of reporting interfaces include information about server state, information about server health, when the statistics were reset, the total number of requests, the number of current requests, the number of bytes sent, the number of bytes received, the response time, and so forth.

The rerouting application program interface 420 permits for appropriate rerouting of application messages. The rerouting application program interface 420 includes a general rerouting API that allows intra-farm routing policy to be specified. Such rerouting might occur due to any number of circumstances.

However, one of the rerouting application program interfaces 420 is an augmentation application program interface 421 that may be used to make an additional server or servers available to service application messages in the network farm. In one embodiment, when augmenting, a server type of the additional server may be specified so that appropriate types of application messages may be routed to that additional server. For instance, if there was only one video server previously in the network farm, and the reporting application program interface 410 indicates that video server bandwidth capacity was reaching capacity, an additional video server may be added. When future application requests arrive for videos, the two video servers may then benefit from load balancing offered by the application message routing module.

The rerouting application program interface 420 also includes a diminution application program interface 422 that allows a user or computing entity to specify when one or more servers are to be removed from the network farm. For example, there are presently five servers in the network farm, and the performance data indicates that two servers may be removed due to reduced demand, the diminution application program interface 422 may be used to identify the two servers that are to be removed.

In one embodiment, the diminution application program interface 422 includes an immediate diminution application program interface 422A, a graceful diminution application program interface 422B, and a draining diminution application program interface 422C.

The immediate diminution application program interface 422A causes all incoming application messages to be routed to the diminished network farm without routing to the server(s) that were removed. In addition, all pending requests that are still in process at the server(s) to be removed are dropped at the time the immediate diminution API is called. In this sense, the network farm is immediately transitioned to the reduced set of servers, and pending requests are terminated.

The graceful diminution application program interface 422B indicates the server(s) that is/are to be removed may continue to serve requests that were in process at the time the graceful diminution API was called, but that all new requests will be routed to the reduced set of servers. Accordingly, unless there were no pending requests at the server to be removed, the server will continue operating until all pending requests are satisfied. Optionally, especially for long running requests, there may be some outside time limit or other event that may cause the server to drop in-process requests.

The draining diminution application program interface 422C is even more deferential to existing requests. When the draining diminution API 422C is called, the server(s) to be removed continue processing not just any pending request, but also attempts to complete any session corresponding to the pending request.

Figure 5:
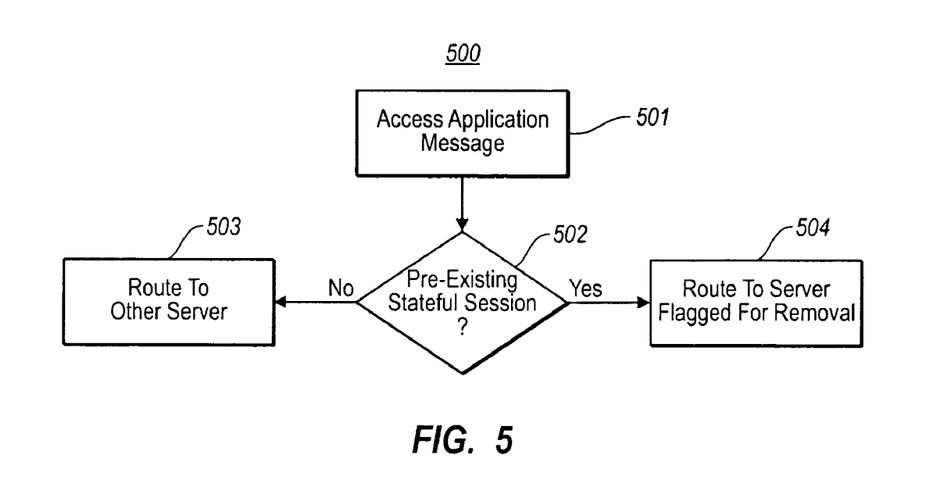
FIG. 5 illustrates a flowchart of a method for gracefully removing a server at from a network farm after a server has been flagged as to be removed.

FIG. 5 illustrates a flowchart of a method 500 for removing a server from a network farm after a server has been flagged as to be removed using the draining diminution API. The method 500 may be performed, for example, each time an incoming application message is received (act 501) and may be performed as part of the act of determining which server the application message is to be routed to in act 325 of FIG. 325. If the application message is not corresponding to a pre-existing stateful session that was service by the server that is flagged for removal (No in decision block 502), then the application message is routed to another server (act 503). On the other hand, if the message corresponds to a pre-existing stateful session that was service by the flagged server (Yes in decision block 502), then the message may be routed to the server (act 504) even though the server has been flagged for removal.

The application program interface 400 of FIG. 4 may also allow the draining diminution process to be terminated such that application messages are routed to other servers, or perhaps even not handled, even though those application messages are associated with a pre-existing stateful session of the server flagged for removal. While this does mean that some sessions may be terminated, it allows for a definitive time at which the server flagged for removal can be actually removed from the network farm, even though there might be some long running sessions continuing. In one embodiment, long running sessions are assigned to a core set of servers that do not tend to be removed from the network farm, even in light conditions, whereas shorter sessions are assigned to the servers that tend to be added and removed more frequently.

Figure 6:
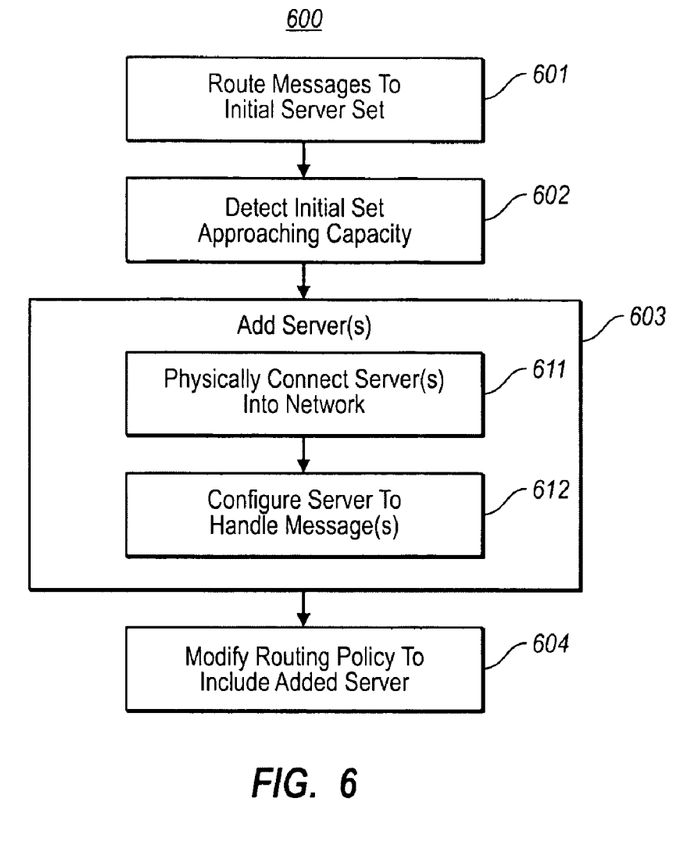
FIG. 6 illustrates a flowchart of a method for augmenting a network farm of one or more servers with at least one additional server.
Figure 7:
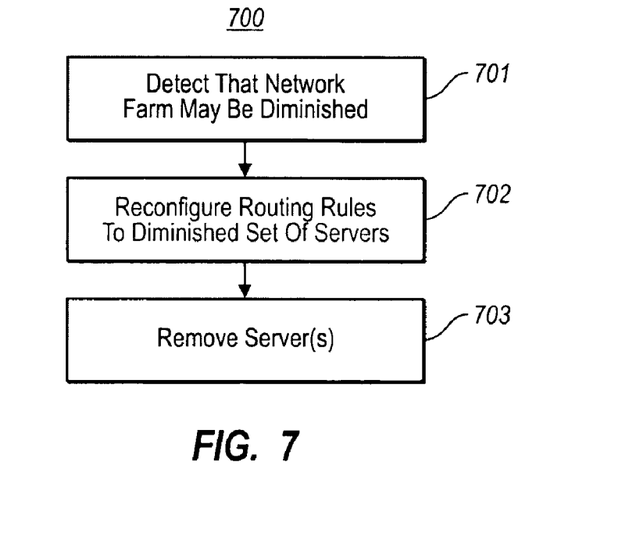
FIG. 7 illustrates a flowchart of a method for downsizing a network farm.

FIG. 6 illustrates a flowchart of a method 600 for augmenting a network farm of one or more servers with at least one additional server. FIG. 7 illustrates a flowchart of a method 700 for reducing the network farm by one or more servers. Both of the methods 600 and 700 may be performed with the aid of the application program interfaces 400 of FIG. 4.

The method of FIG. 6 begins with an act of initially routing incoming messages to an initial set of one or more servers using an application message router that uses configurable routing settings (act 601). In this description and in the claims, the use of the term "initial" should not be construed as meaning that this was the first configuration of the network farm. Rather, the term "initial" is used merely to distinguish original example state of the network farm from subsequent states in the examples.

Figure 8:
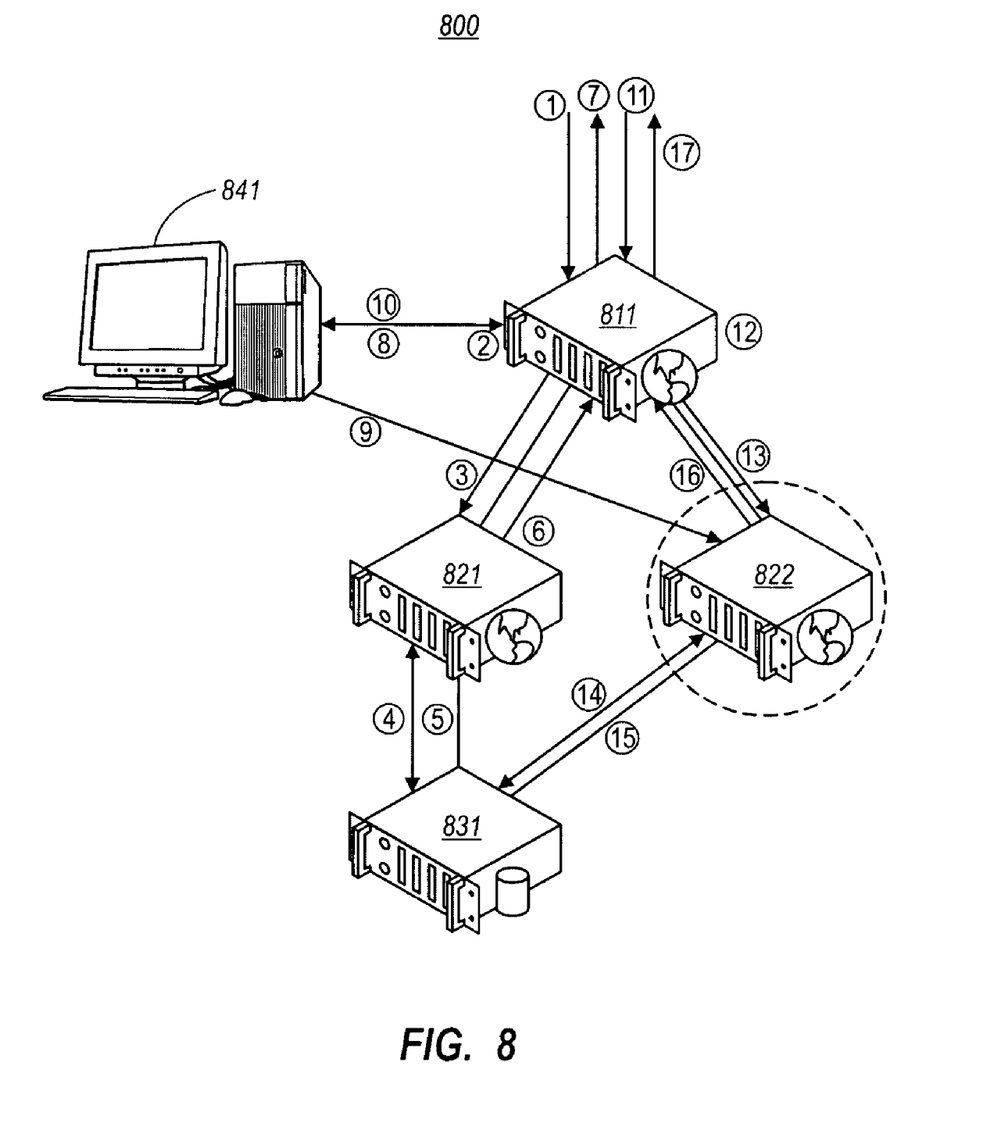
FIG. 8 illustrates an example message flow associated with the routing of an incoming message using an incoming message router.

FIG. 8 illustrates an example message flow 800 associated with this initial routing of act 601. In this configuration, there is a three-tier architecture. The application message routing module is located on the tier-one server 811, although the application message routing module might also be external to the network farm, and perhaps apply distinct routing policies for multiple network farms. A content server is provided as a tier two server 821. A database server is provided as a tier three server 831.

In step 1, a client sends an application message to the tier one server 811 which includes the application request routing module. In step 2, the tier one server 811 uses the configurable routing rules to determine that the application message is to be processed by the tier two server 821. In step 3, the application message is routed to the tier two server 821. As part of the message processing, the tier two server 821 accesses the database 831 as represented by steps 4 and 5. A response is generated and returned by the tier two server 821 to the tier one server 811 as represented by step 6. The tier one server 811 then sends the response back to the client as represented by step 7. The description will now return to FIG. 6 temporarily prior to discussing the remaining steps of FIG. 8.

At some point, a user or other computing entity detects that the initial set of server(s) is approaching capacity (act 602). In FIG. 8, this is represented by step 8, in which the tier one server 811 reports regarding one or more performance parameters to at the external computing system 841. With reference to FIG. 4, this might be accomplished using the reporting application user interface 410 that reports regarding one or more performance parameters of the network farm.

In response, an additional server or servers is added to the network farm (act 603). This may involve making the additional server(s) physical available on a network to receive incoming application messages (act 611). Also, this may involve configuring the additional server to be capable of responding to at least some of the incoming application messages (act 612). For example, the added server may have undergone a mirroring operation in which the operating system, applications, configuration settings, data, and so forth are mirrored from one server to the added server. Alternatively, an additional special purpose server may be added to handle certain kinds of application messages. In FIG. 8, the adding of an additional server 822 (in this case, a tier two server 822) is represented by step 9.

Then, the configurable routing settings are modified such that incoming messages are routed to the augmented set of servers (act 604). In the case of FIG. 8, incoming message may then perhaps be routed not just to the initial set of servers 811, 821 and 831, but also perhaps to the additional server 822. The rerouting policy may take effect instantaneously. If there are incoming messages that corresponding to pre-existing stateful sessions on the server 821, those incoming messages might best be handled by the server 821 on which the session state resides. However, if there are incoming messages that correspond to pre-existing stateless sessions, or which correspond to a new session, those incoming message may be routed to the new server 822.

Returning to the example of FIG. 8, in step 11, a new incoming application message is received by the tier one server 811. In step 12, the application message routing module checks the configurable intra-farm routing policy. Since the application request routing module resides in the network farm and only serves one network farm, the application request routing module will apply only the configurable intra-farm routing policy for the network farm 800. However, if the application request routing module serves multiple network farms, the new incoming message may at least specify the network farm identifier that the message is to be routed to. Although not required, in this case, the intra-farm routing policy specifies that for this particular incoming message, the message is to be routed to the newly added tier two server 822. In step 13, the message is routed to the newly added tier two server 822. In steps 14 and 15, the tier two server 822 may access the tier three database server 831 while processing the message. In step 16, the tier two server 822 sends the response back to the tier one server 811. In step 17, the tier one server 811 returns the response to the client.

FIG. 7 illustrates a flowchart of a method 700 for downsizing a network farm. The downsizing may occur in response to a detection that the network farm is now capable of meeting current demand without one or more servers (act 701). In FIG. 8, this might occur using the computing system 841 in response to receiving a report via the reporting application program interface 410 of FIG. 4.

In response, the configurable intra-farm routing settings of the application message routing module may be modified such the incoming messages are routed to a diminished set of one or more servers of the network farm (act 702). This rerouting may be accomplished using the diminution application program interface 422 of FIG. 4.

If the immediate diminution application program interface 422A were used, incoming messages will no longer be routed to the server flagged for removal, and the server will no longer need to finish any pending requests. Accordingly, in that case, the server may be immediately removed (act 703). For instance, the server may be physically detached from the network, and reprovisioned for other purposes—perhaps for use in another network farm.

If the graceful diminution application program interface 422B were used, incoming messages would not be routed to the server flagged for removal, but the server would be permitted to finish pending requests perhaps subject to some criteria. After all of the pending requests have either been completed, or determined that the completion of the request is waived given the satisfaction of other criteria, the server may then be removed (act 703).

If the draining diminution application program interface 422C were used, incoming messages would only be routed to the server flagged for removal if the message corresponded to a pre-existing stateful session serviced by the server. After all of such stateful pre-existing sessions had been closed, the server may then be removed. Alternatively, even if there were some pre-existing stateful sessions still in progress, the server may still be cut off from incoming messages after some designated time period or upon the detection of one or more criteria being satisfied. At this stage, the server may be removed from the network (act 703).

Accordingly, embodiments have been described in which an application routing module may route application level network requests within a network farm when a network farm is resized in response to changing network demand. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for dynamically upsizing a network farm of one or more servers with at least one additional server in response to network demand, the method comprising:

initially routing incoming application messages to an initial set of one or more server(s) using an application message router that uses configurable routing settings;

identifying a routing policy for the network farm;

statistically tracking information corresponding to the initially routed application messages;

determining from the tracked information that the one or more servers are reaching capacity;

in response to determining that the one or more servers are reaching capacity, adding an additional server to the network farm; and modifying the configurable intra-farm routing settings such that subsequent incoming messages are routed to a subsequent set of servers comprising the initial set of server(s) and the additional server, wherein modifying the configurable routing settings is performed using an application program interface that provides a first interface that permits for immediate rerouting of incoming messages away from one or more servers of the network farm that are not in the diminished set and provides a second interface that permits rerouting of incoming messages with at least temporary continuance of routing of incoming messages that correspond to pre-existing stateful sessions to their pre-existing servers even if those pre-existing servers are no longer in the diminished set of server(s).

2. A method in accordance with claim 1, wherein adding the additional server to the network farm comprises:
   making the additional server physically available on the network farm to receive incoming application messages; and
   configuring the additional server to be capable of responding to at least some of the incoming application messages.

3. A method in accordance with claim 1,
   wherein adding the additional server is performed in response to determining from the tracked information that the one or more servers are reaching capacity.

4. A method in accordance with claim 3, wherein statistically tracking information is performed with the aid of a second first application program interface that reports regarding one or more performance parameters of the network farm.

5. A method in accordance with claim 4, wherein one of the one or more performance parameters comprises an indication of a response time for a request or the amount of work the network farm does to respond to the request.

6. A method in accordance with claim 4, wherein the first and second application program interfaces are part of the same program.

7. A method in accordance with claim 4, wherein the first and second application program interfaces and a routing application that manages the configurable routing rules are all part of the same program.

8. A method in accordance with claim 1, wherein the subsequent set of servers is a first subsequent set of servers, the method further comprising the following after modifying the configurable routing settings such that incoming messages are routed to the first subsequent set of servers:
   removing one of the servers from the network farm; and
   modifying the configurable routing settings such that the incoming messages are routed to a second subsequent set of one or more servers comprising the first subsequent set of servers minus the removed one or more servers.

9. A method in accordance with claim 8, further comprising the following before removing one of the servers from the network farm:
   detecting that the second subsequent set of servers is now capable of meeting current demand without the one or more servers to be removed in the act of removing.

10. A method for dynamically downsizing by one or more servers a network farm comprising a plurality of servers in response to diminished demand, the method comprising:
   identifying a routing policy for the network farm;
   statistically tracking information corresponding to demand upon a first one or more servers;
   determining from the tracked information that the network farm is capable of meeting current demand without the first one or more servers; and
   modifying configurable routing settings such that subsequent incoming messages are routed to a diminished set of second one or more servers of the network farm in response to determining from the tracked information that the network farm is capable of meeting current demand without the first one or more servers, the diminished set not including the first one or more servers,
   wherein modifying the configurable routing settings is performed using an application program interface provides a first interface that permits for immediate rerouting of incoming messages away from one or more servers of the network farm that are not in the diminished set and provides a second interface that permits rerouting of incoming messages with at least temporary continuance of routing of incoming messages that correspond to pre-existing stateful sessions to their pre-existing servers even if those pre-existing servers are no longer in the diminished set of server(s).

11. A method in accordance with claim 10, further comprising:
   removing one of the servers from the network farm.

12. A method in accordance with claim 11, wherein the removing the one or more servers from the network farm comprises:
   making the one or more servers unavailable for incoming messages have a new session or for incoming messages corresponding to a stateless session; and
   keeping the one or more servers available temporarily to handling incoming messages of a preexisting stateful session.

13. A computer program product comprising one or more computer readable devices having encoded thereon one or more computer-executable instructions that, when executed by one or more processors of a computing system, cause the computing system to provide an application program interface, the application program interface comprising:
   a reporting interface that is configured to report regarding one or more performance parameters of a network farm to thereby allow a user or other entity to determine when a network farm is reaching capacity, the reported performance parameters having been identified by identifying a routing policy for the network farm and statistically tracking information corresponding to the one or more performance parameters;
   an augmentation interface that is configured to allow for immediate rerouting of incoming application networks to an augmented network farm in the case where one or more servers are added to the network farm; and
   a diminution interface that is configured to allow for immediate rerouting of an incoming application message to a diminished network farm in the case where one or more servers are removed from the network farm, wherein the diminution interface comprises:
     an immediate diminution interface that causes all incoming application messages to be routed to the diminished network farm and causes all pending requests at the removed server(s) to be terminated;
     a graceful diminution interface that causes all incoming application messages to be routed to the diminished network farm, but allows at least some of the pending requests at the removed server(s) to be continued to completion; and
     a graceful diminution interface that allows some of the removed servers to temporarily continue serving incoming application messages that correspond to pre\-existing stateful sessions that they had been previously serving.

* * * * *